United States Patent [19]
Pagdin et al.

[11] 3,767,026
[45] Oct. 23, 1973

[54] BY PASS MECHANISM FOR A CONVEYOR SYSTEM

[75] Inventors: William G. Pagdin, Milwaukee; Robert F. Risley, Wauwatosa, both of Wis.

[73] Assignee: Jos. Schlitz Brewing Company, Milwaukee, Wis.

[22] Filed: Oct. 29, 1971

[21] Appl. No.: 193,657

[52] U.S. Cl............................................ 198/31 AC
[51] Int. Cl............................................ B65g 47/28
[58] Field of Search.................... 198/29, 30, 31 AC

[56] References Cited
UNITED STATES PATENTS

| | | | |
|---|---|---|---|
| 2,196,389 | 4/1940 | Fogg et al. | 198/31 AC |
| 1,894,547 | 1/1933 | Tucker | 198/31 AC |
| 3,419,128 | 12/1968 | Leonard | 198/31 AC |
| 3,491,873 | 1/1970 | Fauth | 198/204 |
| 2,889,941 | 6/1959 | Mehlis | 198/31 AC X |
| 3,326,349 | 6/1967 | Pettis et al. | 198/31 AC |
| 2,735,599 | 2/1956 | Thurman | 198/34 X |
| 1,669,474 | 5/1928 | La France | 198/30 X |
| 1,101,744 | 6/1914 | Irenius | 53/299 |

*Primary Examiner*—Evon C. Blunk
*Assistant Examiner*—W. Scott Carson
*Attorney*—Glenn O. Starke

[57] ABSTRACT

A by-pass mechanism for a conveyor system which enables a series of articles to be diverted from the main conveying path. The conveyor system includes a main conveyor section for conveying a series of cans or other articles and a by-pass conveyor section which is connected to the main conveyor section. An inverted U-shaped gate is pivotally connected to the side of the main conveyor section and is pivotable between a conveying position, in which it is in alignment with the main conveyor section, and a bypass position in which it serves to divert articles through the by-pass conveyor section. The gate is pivoted by a fluid cylinder mounted on the side of the conveyor and by manual actuation of the cylinder, the gate can be pivoted to the bypass condition which enables a series of the articles to be diverted to the bypass conveyor section for purposes of inspection.

7 Claims, 7 Drawing Figures

INVENTOR.
WILLIAM G. PAGDIN
ROBERT F. RISLEY

PATENTED OCT 23 1973 3,767,026

INVENTOR.
WILLIAM G. PAGDIN
ROBERT F. RISLEY

BY PASS MECHANISM FOR A CONVEYOR SYSTEM

BACKGROUND OF THE INVENTION

In a brewery or soft drink plant cans or bottles are transported through the plant on a series of conveyors. With the use of metal cans it is customary practice to periodically remove a group of cans from the conveyor to check the seams of the can chimes. Normally, the operator will stop operation of the conveyor and manually remove a group of cans from the conveyor.

It is also customary practice to periodically remove a series of cans from the conveyor for a fill check to determine whether the cans have been filled with the proper quantity of the beverage. Under normal practice, the number of cans removed from the conveyor for the fill check corresponds to the number of valves on the filling machine, and with high speed filling machines utilizing 88 valves, it is necessary to remove 88 cans from the conveyor line. The fill check again requires the operator to stop the conveyor, remove the large quantity of cans, and restart the conveyor. These operations of removing cans for inspection purposes interupt the normal flow and increase the downtime of the operation.

SUMMARY OF THE INVENTION

The present invention is directed to a conveyor system having a provision to selectively divert or bypass a series of cans from the main conveyor line for purposes of inspection without stopping operation of the conveyor. According to the invention, the conveyor system includes a main conveyor section, which is adapted to convey a series of cans or other articles, and a bypass conveyor section is joined to the main conveyor section. An inverted U-shaped gate is pivotally connected to the side of the main conveyor section and serves to either direct the cans straight through the main conveyor section or to selectively divert the cans to the bypass conveyor section. The gate is pivoted by means of a fluid cylinder mounted on the conveyor and the cylinder can be selectively operated by the attendant to pivot the gate between the straight-through and bypass positions.

A flexible deflecting member is connected to the gate and serves to enclose the entrance to the bypass conveyor when the gate is in the straight-through position.

The conveying system of the invention enables groups or individual cans to be diverted from the main conveyor line without stopping of the conveyor so that the operation of the filling machine and other equipment can continue without interuption.

The inverted U-shaped gate, which serves to direct the cans to the bypass conveyor provides a stable manner of guiding the cans to the bypass conveyor so that any tendency for the cans to tilt or tip as they are being diverted is minimized.

The unit of the invention is adaptable for use with cans of various heights, and the bypass mechanism can be adjusted to obtain optimum flow characteristics for each particular installation.

Other objects and advantages wil appear in the course of the following description.

The drawings illustrate the best mode presently contemplated of carrying out the invention.

Figure 1:
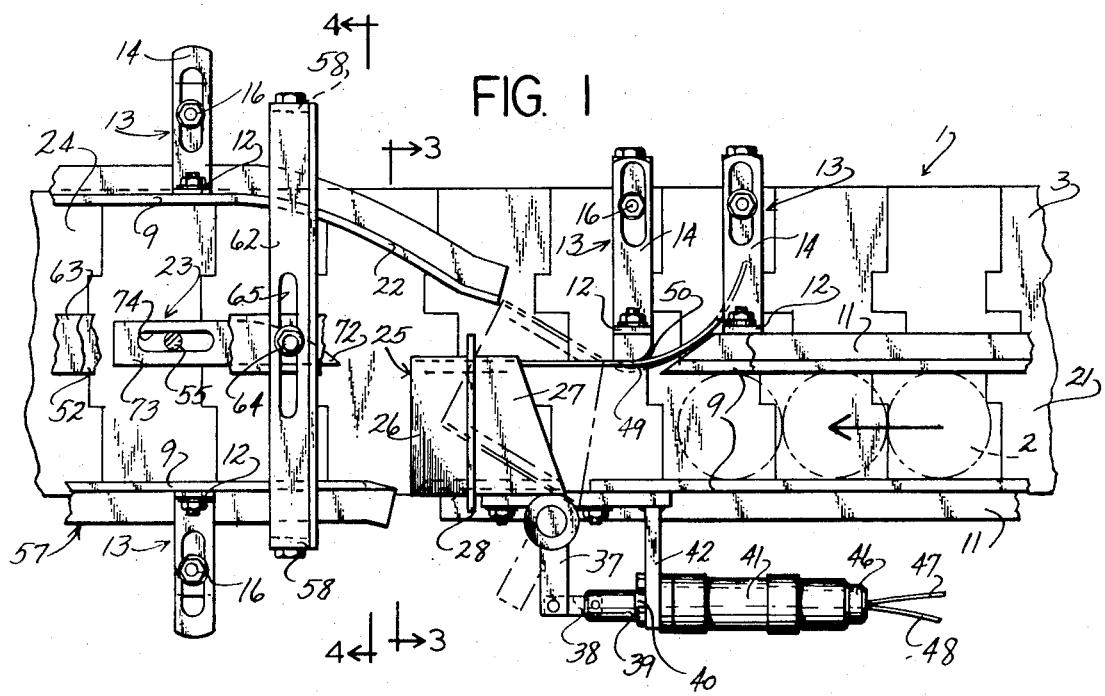
FIG. 1 is a plan view of a conveyor system utilizing the bypass mechanism of the invention.

The drawings illustrate a conveyor 1 for conveying a series of articles 2, such as cans, bottles, or the like. The conveyor 1 includes a standard endless link belt 3 which is mounted for endless movement around a series of rollers, not shown.

The frame of conveyor 1 includes a pair of spaced side members 4, each of which has an inwardly extending upper flange 5 and plastic wear strips 6 are connected to each flange 5 and serve to support the edges of the link belt 3. In addition to upper flanges 5, the lower edges of the side members 4 are provided with flanges 7 which carry wear strips 8 and the return run of the belt 3 is supported on the wear strips 8.

Figure 3:
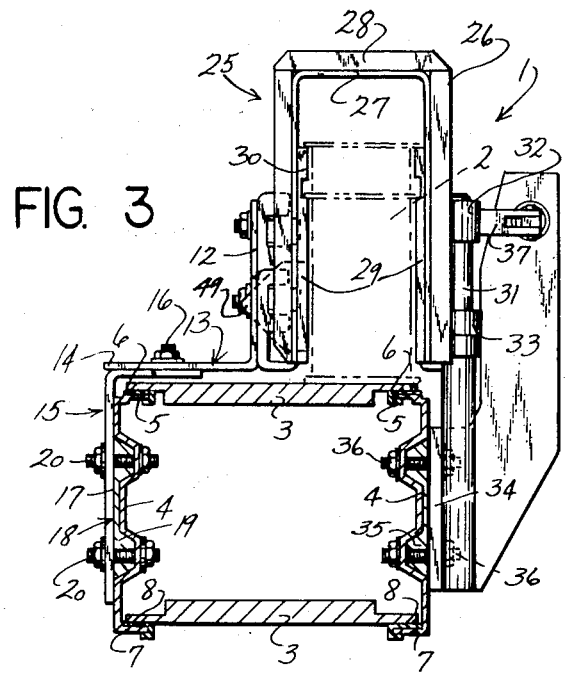
FIG. 3 is a transverse section taken along line 3—3 of FIG. 1.
Figure 7:
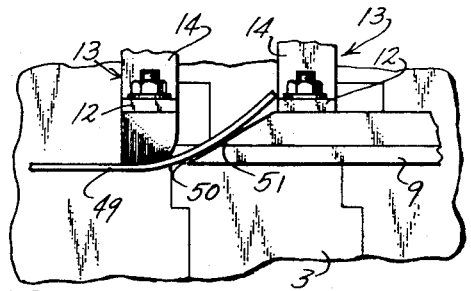
FIG. 7 is a section taken along line 7—7 of FIG. 6.
Figure 4:
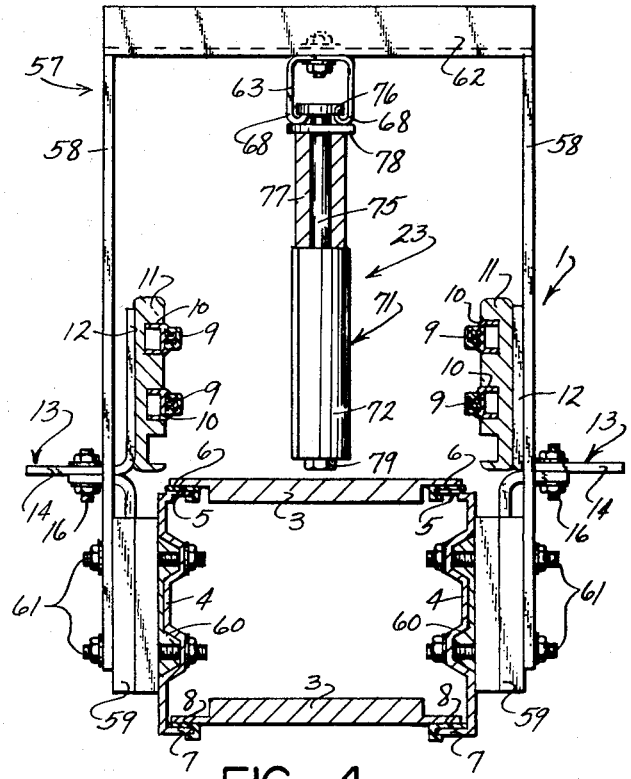
FIG. 4 is a section taken along line 4—4 of FIG. 1.

The cans 2 are guided for travel on the belt 3 by a series of guide rails 9. The guide rails 9, as well as their supporting brackets, are described in the copending United States patent application Ser. No. 870,033, filed Oct. 28, 1969, now U.S. Pat. No. 3,669,244 As best illustrated in FIGS. 3 and 4, each of the guide rails 9 is mounted within a groove 10 in a bracket 11 which is secured to the vertical flange 12 of an angle 13. The horizontal flange 14 of bracket 13 is connected to the horizontal flange of an L-shaped bracket 15 by bolts 16 which extend through slots in the flanges. The vertical leg 17 of each bracket 15 is secured against the outer surface of an insert 18 having a pair of spaced longitudinal ridges or lands 19 which are received within complementary grooves in the side members 4 of conveyor 1. Bolts 20 serve to connect the vertical leg 17 of each bracket 15 to the side members 4.

Due to the use of the L-shaped brackets 13 and 15, and the slotted connection therebetween, the position of the guide rail 9 can be adjusted laterally with respect to the belt 3. For example, by facing the horizontal flange of the bracket 15 inwardly and facing the horizontal flange 14 of bracket 13 outwardly, the guide rails 9 can be positioned over the belt 3. Conversely, by facing the horizontal flange of bracket 15 outwardly and facing flange 14 inwardly, the guide rails 9 can be located laterally outward of the belt 3. In addition, the slotted connection of bolts 16, provides added lateral adjustment. Thus, this construction enables the guide rails 9 to be adjusted through a substantial distance laterally with respect to the belt 3.

The guide rails 9 define a main conveying path 21 in which the cans 2 are conveyed in an end-to-end, single-row relation. A guide rail 22 extends outwardly at an angle from one of the guide rails 9, and the guide rail 22 is spaced from a central divider unit 23 to provide a bypass passage 24 therebetween. The divider unit 23 is also spaced from the opposite guide rail 9 and this space constitutes a portion of the main conveying passage 21.

As illustrated in FIG. 1, the cans 2 are conveyed in the direction of the arrow and normally pass straight through the main conveying passage 21. At certain times it may be desired to remove or divert one or a group of cans from the main conveying passage for purposes of inspection. In accordance with the invention, a diverter unit 25 is associated with the conveyor and functions to divert the cans 2 from the main conveying passage 21 into the bypass passage 24. The diverting unit 25 includes an inverted U-shaped gate 26 which is pivotally connected to the one of the side members 4 of the conveyor. Gate 26 includes a U-shaped casing 27 and a stiffening rib 28 is secured edge-wise to the sides and top of the casing 27. To reduce the frictional resistance of the cans passing through the gate 26, a layer of low friction plastic material 29 such as nylon or Teflon (polytetrafluoroethylene) is secured to the inner surface of each of the side walls of casing 27.

As best illustrated in FIG. 3, each of the layers 29 is provided with a groove 30, which is positioned at a height so as to receive the chime on the upper end of a 12 ounce can. The upper ends of the layers 29 terminate a substantial distance be benath the top of the casing 27 so that the chime on a taller 16 ounce can will be located above the layer 29.

Figure 2:
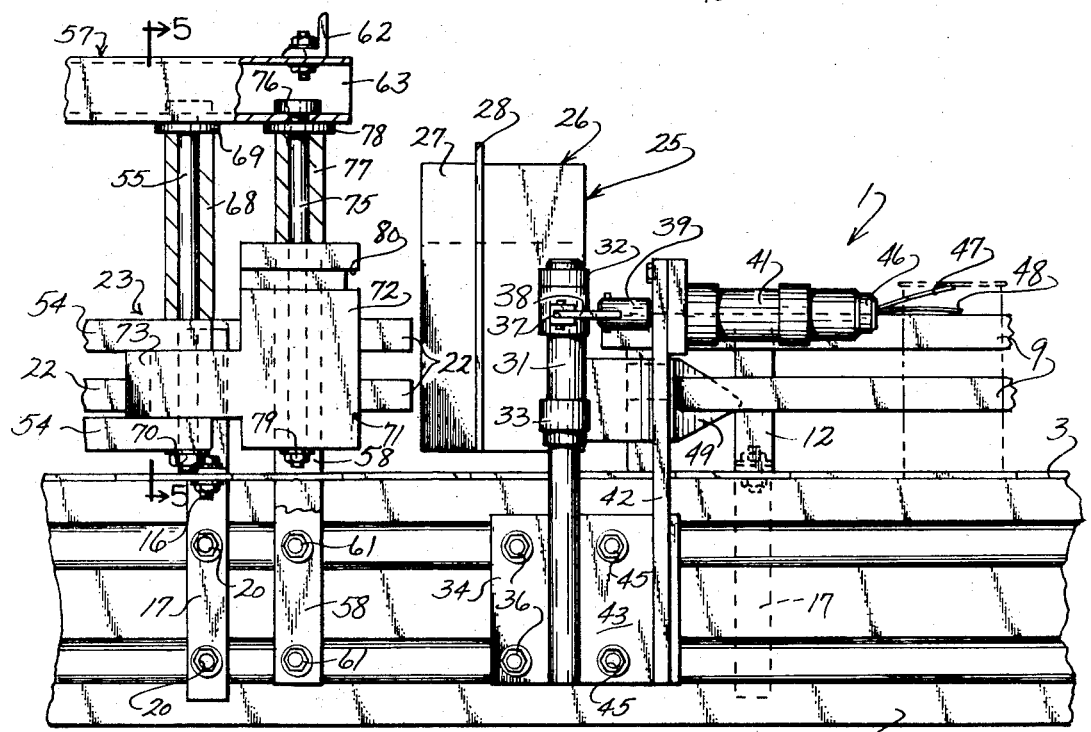
FIG. 2 is a side elevation of the structure shown in FIG. 1 with parts broken away in section.

The gate 26 is pivotally connected to a fixed vertical shaft 31 by a pair of bearing assemblies 32 and 33, both of which are secured to the casing 27. As shown in FIGS. 2 and 3, the lower end of the shaft 31 is welded to a vertical flange 34 which is attached through an insert 35, similar to insert 18, to the side wall 4 of the conveyor by a series of bolts 36.

In order to pivot the gate 26 about the axis of the fixed shaft 31, a link 37 is secured to the upper bearing 32 and is pivotally connected to one end of a link 38. The opposite end of link 38 is pivotally connected to one end of a clevis 39, while the opposite end of the clevis is pivotally connected to a piston rod 40 that is slidable within a fluid cylinder 41.

Cylinder 41 is supported from the conveyor 1 by a vertical plate 42 that is welded to one end of the cylinder. A flange 43 is secured to the lower end of the plate and is attached through an insert, similar to insert 18, to the side wall 4 of the conveyor by bolts 45.

The cylinder 41 is a standard pneumatic or hydraulic type, and a valve unit 46 is mounted on one end of the cylinder and lines 47 and 48 connect the valve unit to the respective ends of the cylinder. By introducing fluid from the valve unit 46 through line 48, the piston rod 40 will be extended to thereby move the gate 26 to the phantom position shown in FIG. 1, where it is in alignment with the bypass passage 24 so that the cans moving along the main passage 21 will be diverted through the gate 26 and into the bypass passage 24. By introducing fluid through the valve unit 46 into line 47, the piston rod 40 will be withdrawn, thereby pivoting the gate to the straight-through position shown in FIG. 1, whereby the cans will pass through the gate in their movement along the main conveyor passage 21.

A flexible shield or deflector 49 is incorporated with the gate to provide a side closure when the gate is in the straight-through position, as illustrated in FIG. 1. One end of the flexible shield 49 is connected between the plastic layer 29 and the respective side wall of casing 27 and the opposite end of the shield is curved and extends through a slit 50 in the lower guide rail 9. At the location of the slot 50, the lower guide rail 9 is provided with a tapered end, as indicated at 51, and the central portiaon of the shield bears against this tapered end.

Figure 6:
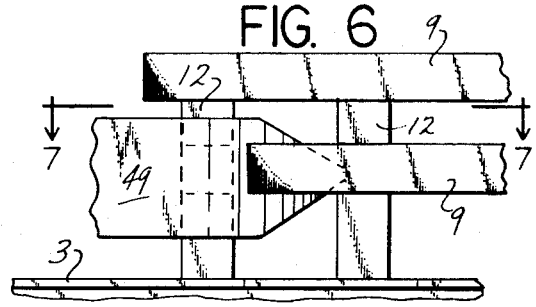
FIG. 6 is a side elevation showing the flexible baffle associated with the gate.
Figure 5:
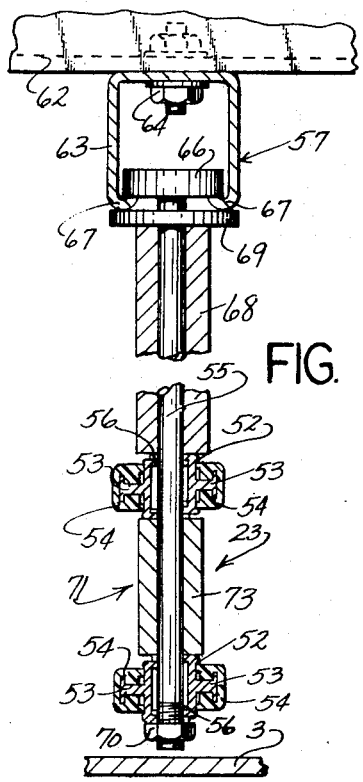
FIG. 5 is a view taken along line 5—5 of FIG. 1.

The upper guide rail 9 is located above the upper edge of the shield 49, as shown in FIG. 6.

As the gate 26 pivots between the straight-through and bypass positions, the shield 49 will ride along the tapered end 51 and the vertical leg 12 of the angle bracket 13, and the flexible nature of the shield enables the shield to change its curvature as necessary during this movement.

The divider unit 23 includes a main section composed of a pair of vertically spaced supports 52, each of which is formed of a pair of interlocked channels. Each channel is provided with an outwardly extending T-shaped ridge 53 and plastic guide rails 54 are engaged with the ridges 53. Guide rails 54 are similar in construction to the guide rails 9, and a pair of guide rails 54 are located on either side of the divider 23.

To connect the support members 52 together at intervals throughout their length, a series of vertical threaded rods 55 project through aligned openings 56 in the support members 52 and in suitable spacer sleeves, not shown, which extend between the members 52. The supports members 52 are suspended through rods 55 from a frame 57 which is secured to the conveyor 1. As shown in FIG. 4, the frame 57 includes a series of vertical columns 58, the lower ends of which are connected through blocks 59 and inserts 60 to the side walls 4 of the conveyor 1 by studs 61. Transverse angle members 62 are secured to the upper ends of corresponding pairs of columns 58 to provide a generally U-shaped frame.

A longitudinal channel member 63 is supported from the transverse angles 62 and the open side of the channel faces downwardly, as illustrated in FIG. 4. Bolts 64 extend through slots 65 in the horizontal flange of the angle 62 and through a hole in the web of the channel to provide an adjustable connection for the channel 63 with respect to the frame which enables the channel to be adjusted transversely of the frame and conveyor belt 3.

To support each rod 55 from the longitudinal channel 63, the upper end of the rod is provided with an enlarged head 66 which rests on the lips 67 formed on the flanges of the channel 63. Rod 55 extends within a sleeve 68, and a washer 69 connected to the upper end of the sleeve 68 bears against the lower edges of the lips 67 of the channel 63, while the lower end of sleeve 68 seats against the upper rail support member 52. As previously noted, rod 55 extends through openings 56 in the support member 52 and the lower threaded end of the rod receives a nut 70.

Depending on the length of the divider unit any number of rods 55 can be utilized to support the divider unit 23 from the frame 57.

The divider unit 23 also includes an end member 71 having a tapered tip 72 that separates the main conveyor passage 21 and the bypass passage 24. The rear end of the end member 71 is provided with a projection 73 which is received between the support members 52 and serves as a spacer. To provide an adjustment for positioning the end member with respect to the frame 57, the rod 55 extends through a slot 74 in the projection 73. This slotted connection permits the end member 71 to be adjusted longitudinally to thereby position the tip 72 at the proper location to provide optimum flow characteristics for the cans 2, or other articles.

The end member 71 is supported from the frame 57 in a manner similar to that employed for supporting the support members 52 of the divider unit. A rod 75 is provided with an enlarged head 76 that is received within the channel 63 and rests on the lips 68. Rod 75 extends downwardly through a spacing sleeve 77, and the upper end of the sleeve is provided with a washer 78 that bears against the lower extremity of the channel 63. Rod 75 extends through an opening in end member 71 and the lower end of the rod 75 receives a nut 79.

To accommodate the upper chime of a 12 ounce can, the peripheral surface of the end member 71 is provided with a groove 81.

The use of the channel 63 permits the rods 55 and 75 to be moved longitudinally with respect to the channel to thereby adjust the position of the end member 71.

In operation, the cans 2 are conveyed between the guide rails 9 in the main conveyor passage 21 in a single row and normally will pass straight through the gate 26 which is aligned with the main conveyor passage. When it is desired to remove or divert one or a group of cans from the main conveyor line for purposes of inspection, the gate 26 is pivoted to the bypass position by operation of the cylinder 41 and the cans passing within the main conveying passage 21 will then be diverted through the gate 26 into the bypass passage 24. When a sufficient quantity of cans have been diverted for inspection purposes, the gate 26 is pivoted back to its original straight-through position and the cans will then move through the gate 26 along the main conveying path.

The invention enables single cans or groups of cans to be selectively removed from the main conveying path without shutting down operation of the conveyor. The operation of the fluid cylinder is extremely fast so that even single cans can be removed from the main conveying line in high-speed conveyor systems.

The U-shaped gate 26 supports the cans throughout their entire height, thereby preventing any tendency for the can to tilt or tip as they are moved to the bypass passage.

The mechanism of the invention is adaptable for use with cans of various heights, and includes adjustments for the guide mechanism which enables the optimum flow characteristics to be obtained for each particular installation.

The cylinder 41 is the type in which the piston bottoms out at the ends of the cylinder to determine the stroke of travel. This construction provides a less expensive unit and also precisely indexes the gate 26 in both the straight-through and bypass positions.

While the drawings illustrate the diverted cans being conveyed within the bypass passage 24, it is contemplated that the bypass zone need not be a conveyor, but could be an accumulating area or other receptacle for receiving the diverted cans or other articles. Similarly, the portion of the main conveying passage 21 located between the divider unit 23 and the guide rail 9 need not be in longitudinal alignment with the up stream portion of the conveyor passage 21 located between the guide rails 9, but instead these two portions of the passage 21 can be located at an angle to each other with the degree of pivotal movement of the gate 26 being adjusted accordingly.

Various modes of carrying out the invention are contemplated as being within the scope of the following invention particularly pointing out and distinctly claiming the subject matter which is regarded as the invention.

We claim:

1. In a conveyor system, a conveyor, a first guide member located above the conveyor, a second guide member located above the conveyor and disposed in spaced relation to said first guide member with the space between said first and second guide members defining a conveying path for movement of articles on said conveyor, said second guide member having an opening, a gate mounted on the conveyor and located adjacent the opening, said gate including a pair of spaced side walls defining a passage therebetween and having a cross member rigidly connected between said side walls, pivotal means for pivotally connecting the gate to the conveyor adjacent said first guide member whereby the entire gate can be pivoted between a first position, in which the passage is aligned with said conveying path, to a second position in which said passage is aligned with the opening in said second guide member whereby articles passing along said path are diverted through said passage to said opening, the length of the side wall of the gate is less than the length of the opening in said second guide member to provide a gap between an end of said gate and the edge of said second guide member bordering said opening when said gate is in the first position, and a flexible baffle member extending across the said gap and disposed to flex when the gate is moved to said second position, and means for moving the gate between said first and second positions.

2. The conveying system of claim 1, including a low friction coating applied to the inner surface of said side walls of the gate to faciliate movement of said articles through said passage.

3. The conveying system of claim 1, wherein said baffle member connected to the gate and is curved laterally outward and disposed to ride against said second guide member as the gate is pivoted between said first and second positions.

4. The conveying system of claim 1, and including a second conveying path communicating with said opening, and said system includes a divider member located between said first and second conveying paths, said divider member having a tapered tip facing toward said gate.

5. The conveyor system of claim 4, and including means for adjusting the position of said tapered tip in a direction longitudinal of the direction of movement of said conveyor.

6. The conveyor system of claim 4, and including means for adjusting the position of said tapered tip in a direction transverse of the direction of movement of said conveyor.

7. In a conveyor system, a conveyor for conveying articles, guide means for guiding articles in movement on said conveyor, a by-pass area disposed to receive articles diverted from said conveyor, said guide means having an opening communicating with said by-pass area, a gate located above said conveyor and having a pair of spaced side members defining a passage, said gate being mounted for movement between a first position in which said passage is disposed in alignment with said conveyor and one of said members partially closes off said opening in said guide means and a portion of said opening is exposed, to a second position in which said passage is disposed in alignment with said opening whereby articles will be conveyed from said conveyor through said passage to said by-pass area, means for moving said gate between said first and second positions, and flexible closure means for closing the exposed portion of said opening when the gate is in the first position, said closure means is a flexible strip mounted on the gate and disposed to ride against the guide means as the gate is moved between the first and second positions.

* * * * *